United States Patent
Tseng

(10) Patent No.: US 6,794,990 B2
(45) Date of Patent: Sep. 21, 2004

(54) ELECTRONIC PATCH THERMOMETER

(75) Inventor: Daniel C. M. Tseng, Taipei Hsien (TW)

(73) Assignee: K-Jump Health Co., Ltd., Taipei Hsien (TW)

( * ) Notice: Subject to any disclaimer, the term of this patent is extended or adjusted under 35 U.S.C. 154(b) by 171 days.

(21) Appl. No.: 10/139,402

(22) Filed: May 7, 2002

(65) Prior Publication Data

US 2003/0210146 A1 Nov. 13, 2003

(51) Int. Cl.[7] ............................................. G08B 17/00
(52) U.S. Cl. .................. 340/584; 340/573.1; 340/586; 340/870.16; 340/539; 374/100; 374/163; 374/152
(58) Field of Search .............................. 340/584, 573.1, 340/870.01, 870.16, 870.17, 595, 586, 870.07, 539; 374/100, 163, 152, 156, 151

(56) References Cited

U.S. PATENT DOCUMENTS

| | | | | |
|---|---|---|---|---|
| 3,704,803 A | * | 12/1972 | Ponder | 215/11.2 |
| 3,949,388 A | * | 4/1976 | Fuller | 340/870.17 |
| 4,314,143 A | * | 2/1982 | Bilstad et al. | 219/497 |
| 5,169,236 A | * | 12/1992 | Iest | 374/156 |
| 5,181,521 A | * | 1/1993 | Lemelson | 600/549 |
| 5,186,047 A | * | 2/1993 | Gordon et al. | 374/151 |
| 5,733,313 A | * | 3/1998 | Barreras, Sr. et al. | 607/33 |
| 5,938,619 A | * | 8/1999 | Dogre Cuevas | 600/549 |
| 6,087,641 A | * | 7/2000 | Kinouchi et al. | 219/619 |
| 6,300,871 B1 | * | 10/2001 | Irwin et al. | 340/539.28 |
| 6,646,567 B1 | * | 11/2003 | Olivas | 340/870.17 |

* cited by examiner

*Primary Examiner*—Jeffery Hofsass
*Assistant Examiner*—Daniel Previl
(74) *Attorney, Agent, or Firm*—Birch, Stewart, Kolasch & Birch, LLP

(57) ABSTRACT

An electronic patch thermometer consists of a measuring apparatus attaching to or disposing on a targeted object (such as human body skin or a tongue surface, indoor or outdoor, surfaces of a container, water tanks, and the likes) and a receiving apparatus for receiving signals measured by the measuring apparatus. When the receiving apparatus is moved nearby the measuring apparatus and a measuring switch located on the receiving apparatus is pressed, the receiving apparatus generates a magnetic field transmitting to the measuring apparatus to generate electric power required. The measuring apparatus measures and induces temperature signals of the targeted object and transmits the signals by radio waves to the receiving apparatus which reads and displays the temperature value of the targeted object.

15 Claims, 5 Drawing Sheets

ELECTRONIC PATCH THERMOMETER

FIELD OF THE INVENTION

The present invention relates to an electronic patch thermometer and particularly to an electronic patch thermometer for attaching to or disposing on targeted measuring objects (such as human skin or mouth cavity surface, indoor or outdoor, container surfaces, water tanks, and the likes) to measure temperature quickly, conveniently and easily.

BACKGROUND OF THE INVENTION

There are many different types of electronic thermometers now available for measuring human body temperature, such as rigid pen-like thermometers, flexible pen-like thermometers, pacifier thermometers, infrared ear thermometers, and the likes. Most electronic thermometers adopt a basic principle: resistance values of thermistor or other thermal induction elements change when they are subject to different temperatures, then the incurred changes are calculated and converted to temperatures. It usually takes about sixty seconds to complete required measurements and calculations. It is a rather long period of time in terms of temperature measurement. People often feel uneasy or uncomfortable, especially for some patient groups (such as infants). Moreover, while the infrared ear thermometers can measure temperatures rather quickly, accuracy of measurements are dubious due to changes of ambient temperature and complexity of operations (such as the induction elements are difficult to focus on the tympanic drum due to tortuous auditory canals, or the measuring elements have faulty responses and measurements due to wide swing of ambient temperatures).

Operating procedures for electronic thermometers set forth above generally include the steps of: sterilize and put on probe cover, turn on the device, enter standby mode, place the thermometer to measuring locations (usually oral cavities, axilla, rectal or skin surfaces), proceed measurements and display measured values by Celsius or Fahrenheit degrees. Hence people who take the measurement have to be in a conscious condition, and all other activities must be suspended. Measurement procedures are routines (such as turn on the devices, place the devices to the measuring locations, try to make thermal balance, etc.) and measuring time is consumptive. All this creates a lot of problems.

In addition, there are many other temperature measuring apparatus have been developed for measuring temperatures of objects other than human body, such as indoor/outdoor electronic thermometers, bathtub thermometers, feeding bottle thermometers and the likes. Most of these thermometers are integrally formed. To take measurements, people have to go outdoors (such as outdoor thermometers), or "very close" to the thermometers, or even submerge the thermometers in fluid food (such as feeding bottle thermometers). Besides being not convenient and having sanitary concerns, there are also safety concerns when measuring high temperature is involved (such as boiling water, high temperature containers).

SUMMARY OF THE INVENTION

Therefore, the primary object of the invention is to resolve aforesaid disadvantages. The invention provides an electronic patch thermometer for measuring human body temperature that has a shrunk measuring end (shaped like a patch) that can be attached to people's skin or put in oral cavity continuously and comfortably without using battery. Measuring time is short and measurement may be done whenever desired without interfering user's activity (such as sleeping), and also conforms to environmental protection requirements.

Another object of the invention is to provide an electronic patch thermometer for measuring non-human body temperature that can be attached to or disposed on a targeted location such as indoor/outdoor objects or household goods and lavatory facilities to simplify operation procedures and improve protection for people.

A further object of the invention is to provide a system on chip (SOC) technology to integrate electronic elements to facilitate mass production and to increase popularity of the product.

Yet another object of the invention is to provide a low cost electronic patch thermometer to substitute mercury thermometers in medical institutions or homes to reduce mercury pollution.

Still another object of the invention is to provide a simple measuring method that can measure temperature instantly and accurately.

To achieve the foregoing objects, the electronic patch thermometer of the invention consists of a measuring apparatus and a receiving apparatus. The measuring apparatus is formed in a thin patch which may be attached to the skin surface of a user or a desired location where temperature is to be measured. Then the receiving apparatus may be moved close to the measuring apparatus. The receiving apparatus has a measuring switch which may be pressed to activate the receiving apparatus to generate a magnetic field which induces the measuring apparatus to generate electric power required. The measuring apparatus instantly detects the temperature of the targeted object and transmits temperature signals by radio waves to the receiving apparatus, and the receiving apparatus instantly processes and displays temperature value of the targeted object.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
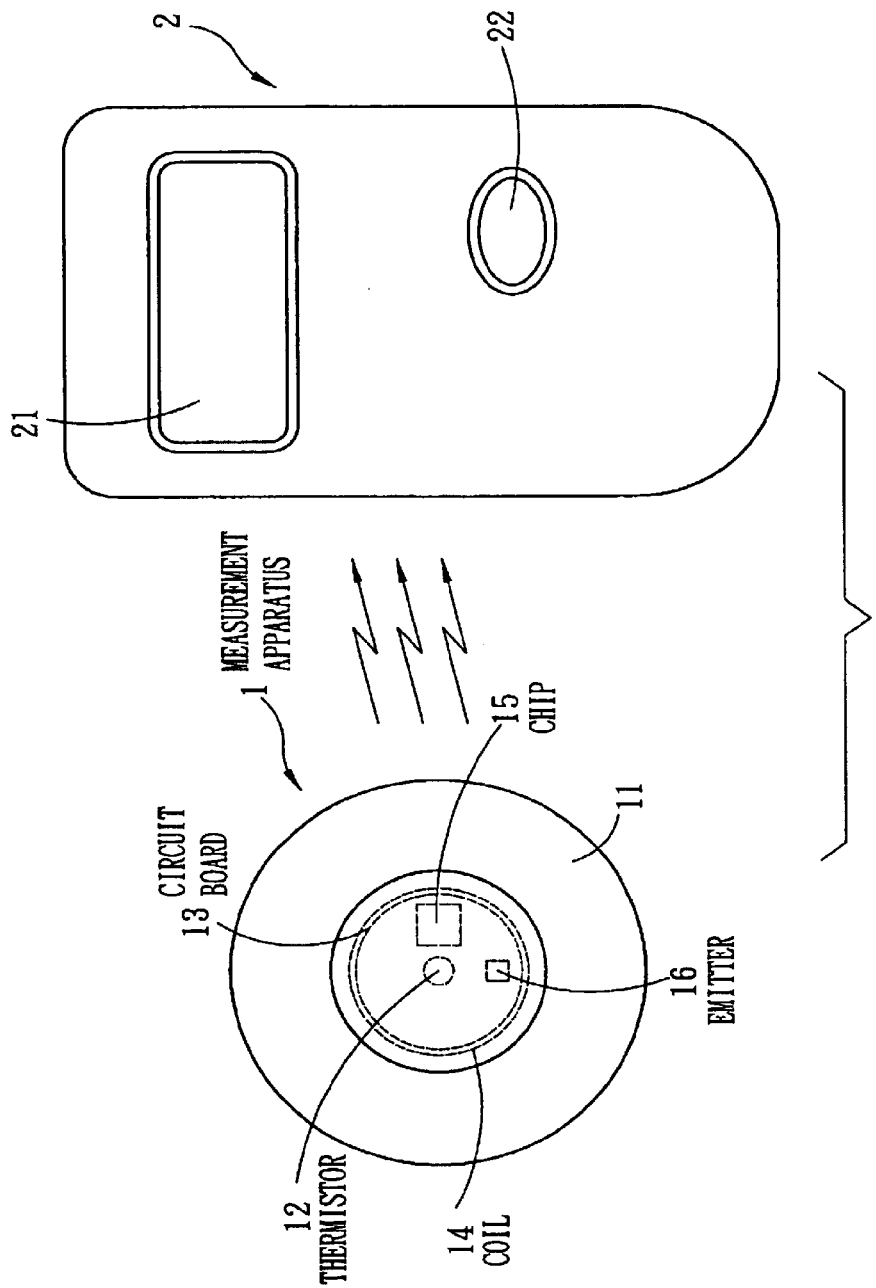
FIG. 1 is a schematic view of an electronic patch thermometer of the invention.
Figure 2:
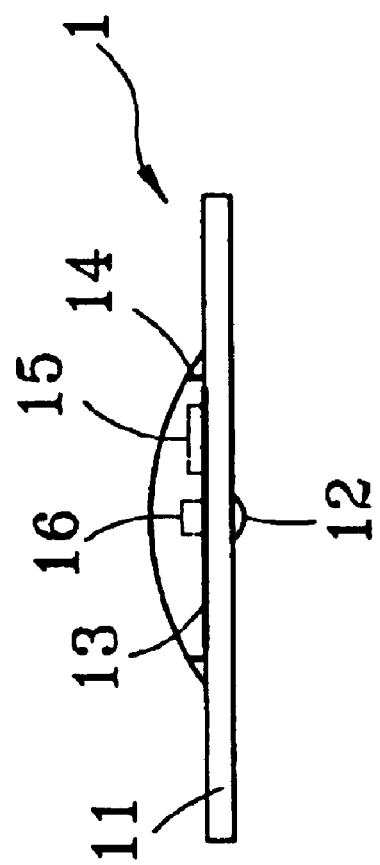
FIG. 2 is a side view of a patch of the invention.

Referring to FIGS. 1 and 2, the electronic patch thermometer of the invention consists of a measuring apparatus 1 for attaching to a targeted object and a receiving apparatus 2 for receiving signals measured by the measuring apparatus 1. The measuring apparatus 1 does not require electric power when not in use and has a shrunk (shaped like a patch) measuring end that can be attached to or disposed on the targeted object continuously and smugly. The measuring apparatus 1 has a thermistor element to measure the temperature of the targeted object. When a measuring switch located on the receiving apparatus 2 is pressed and the receiving apparatus 2 is moved close to the measuring apparatus 1, the measuring apparatus 1 immediately generates electric power and transmits the measured signals by radio waves to the receiving apparatus 2 which reads and displays the measured temperature value.

The measuring apparatus 1 includes a patch 11 for attaching to or disposing on the targeted object. The patch 11 has one side with a thermistor element 12 located thereon for inducing temperature and another side with a circuit board 13 and an induction coil 14 located thereon. The circuit board 13 includes a data processing element (chip) 15, a conversion circuit (not shown in the drawings) and an emitter 16.

The receiving apparatus 2 includes a display screen 21 for displaying data, a measuring switch 22 for activating the receiving apparatus 2 and a circuit (not shown in the drawings) located therein.

When a user presses the measuring switch 22, the receiving apparatus 2 is immediately activated and enters a measuring mode. Meanwhile the circuit in the receiving apparatus 2 actuates a magnetic field generation unit to generate a magnetic field for transmitting to the measuring apparatus 1. The induction coil 14 in the measuring apparatus 1 receives signals of the magnetic field and generates an AC power which is converted by the conversion circuit located in the circuit board to become a DC power required by the measuring apparatus 1. In the mean time, the thermistor element 12 is induced to generate temperature signals which are transmitted immediately to the data processing element (chip) 15 for processing. Then the emitter 16 emits the signals to the receiving apparatus 2 which processes the signals through the circuit located therein, and displays the measured temperature from the targeted people or object on the display screen 21. Users may read the data on the screen to know the temperature of the targeted object.

Figure 3:
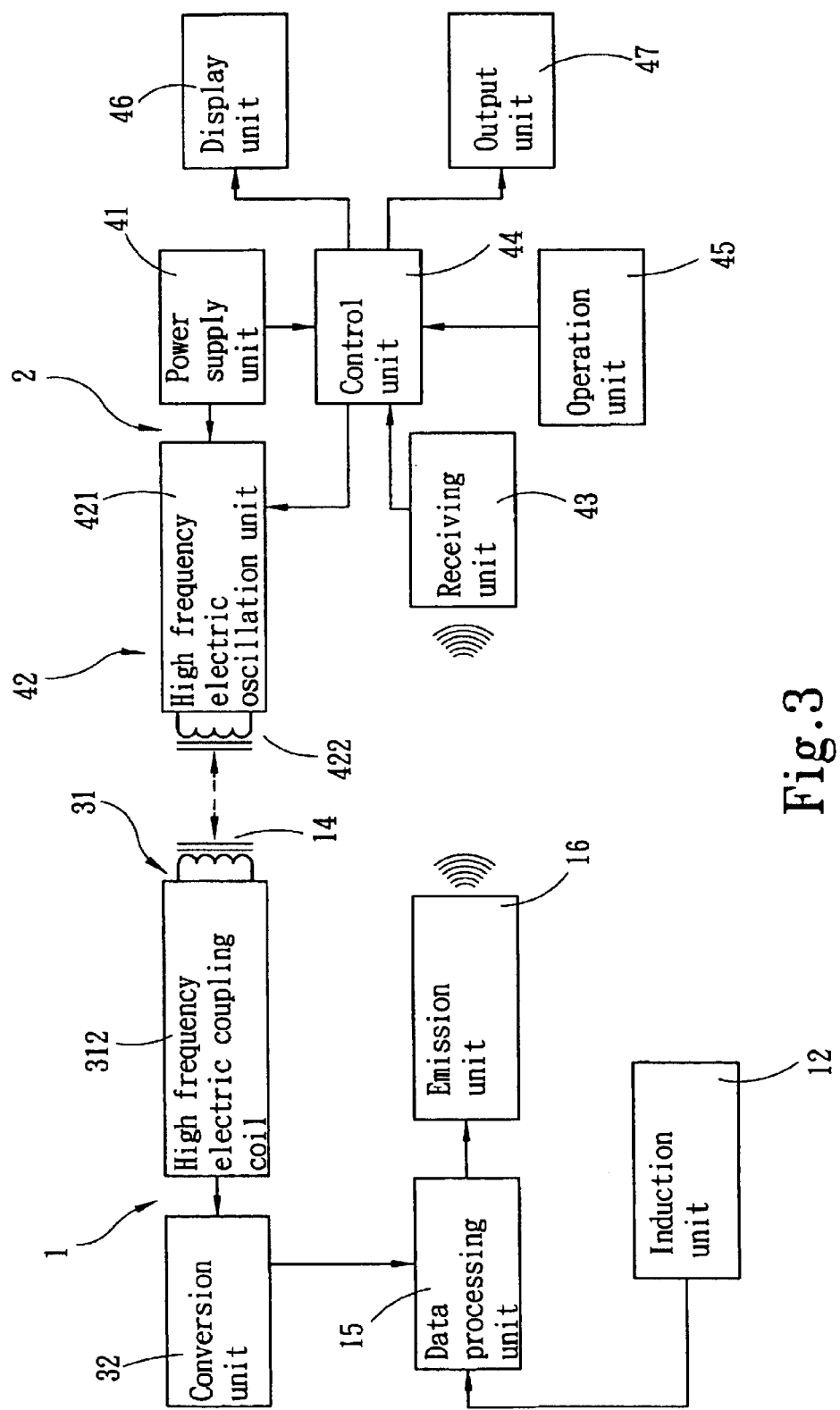
FIG. 3 is circuit block diagram for the invention.

Refer to FIG. 3 for a circuit diagram of the invention. The circuit includes a measuring apparatus 1 and a receiving apparatus 2 for receiving signals measured by the measuring apparatus 1.

The measuring apparatus 1 consists of:

a magnetic field induction unit 31 which includes a magnetic field induction device formed by a 14 and a high frequency electric coupling coil 312. The magnetic field induction device receives magnetic field generated by the receiving apparatus 2 and through the high frequency electric coupling coil 312 converts to AC electric power for output;

a conversion unit 32 which is a rectifying filter circuit for converting AC power to DC power and connects to an output end of the magnetic field induction unit 31 for receiving AC power output from the magnetic field induction unit 31 and converting to DC power required by a data processing unit 15 for activating the measuring apparatus 1 which does not have battery;

an induction unit 12 which is a thermistor or thermal induction element for attaching to human skin or disposing on the targeted object to measure the temperature;

a data processing unit 15 is a microprocessor chip and connects to an output end of the induction unit 12 for receiving temperature signals of the targeted object that are induced by the induction unit 12, and processes the signals for output;

an emission unit 16 connects to an output end of the data processing unit 15 to receive the processed signals from the data processing unit 15, and emits the signals by radio waves; and the receiving apparatus 2 consists of:

a power supply unit 41 which is a battery or city power to provide required power supply for the receiving apparatus 2;

a magnetic field generation unit 42 includes a high frequency electric oscillation unit 421 and a magnetic field generator 422 formed by a coil. The high frequency electric oscillation unit 421 receives DC electric power from the power supply unit 41 and converts the DC electric power to AC electric power for output to the magnetic field generator 422, and the magnetic field generator 422 generates a magnetic field;

a receiving unit 43 receives signals emitted from the emitter 16 of the measuring apparatus 1;

a control unit 44 includes a microprocessor chip for receiving output signals from the receiving unit 43, and processing and outputting the signals;

an operation unit 45 includes a plurality of button keys and connects to an input end of the control unit 44 for operating the receiving apparatus 2;

a display unit 46 connects to an output end of the control unit 44 for displaying numerical signals output from the control unit 44; and an output unit 47 includes a buzzer or a speaker and connects to an output end of the control unit 44 for displaying audio signal output from the control unit 44.

When a user presses the switch of the receiving apparatus 2, the receiving apparatus 2 is immediately activated and enters a measuring condition. The high frequency electric oscillation unit 421 of the magnetic field generation unit 42 receives DC power from the power supply unit 41 and converts the DC power to AC power and outputs to the magnetic field generator 422 which generates a magnetic field and emits the magnetic field.

When the coil 14 of the measuring apparatus 1 receives magnetic field generated by the receiving apparatus 2, through the high frequency electric coupling coil 312, converts to AC electric power for output, and through the conversion unit 32 converts to DC power required by the data processing unit 15 for activating the battery-less measuring apparatus 1.

The induction unit 12 induces temperature signals of the targeted object and inputs the signals to the data processing unit 15 for processing, then through the emission unit 16 to emit the signals.

The receiving unit 43 of the receiving apparatus 4 receives the signals emitted from the measuring apparatus 1, and transfers to the control unit 44 which processes and transfers to the display unit 46 or output unit 47 for displaying the results in the form of numerical data, speeches or audio alarm.

The measuring apparatus 1 of the electronic patch thermometer may be attached to a selected location indoor or outdoor. Users may activate the receiving apparatus 2 at a remote location to read the temperature measured by the measuring apparatus 1 without going to where the measuring apparatus 1 is installed.

Figure 4:
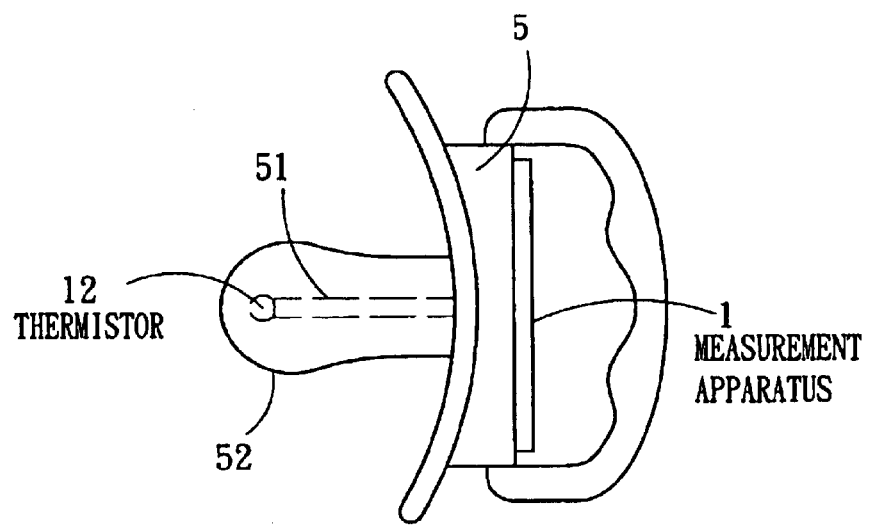
FIG. 4 is a schematic view of an embodiment of the invention in use.

Refer to FIG. 4 for another embodiment of the invention in use. The patch measuring apparatus 1 is attached to one side of a pacifier 5. The induction element 12 is extended into the sucking section 52 of the pacifier 5 through a rod 51. When an infant sucks the pacifier 5, the induction element 12 induces infant's temperature. When the receiving apparatus 2 is moved nearby or within the effective distance, press the measuring switch 22 of the receiving apparatus 2, the receiving apparatus 2 immediately receives infant's temperature detected by the measuring apparatus 1.

Figure 5:
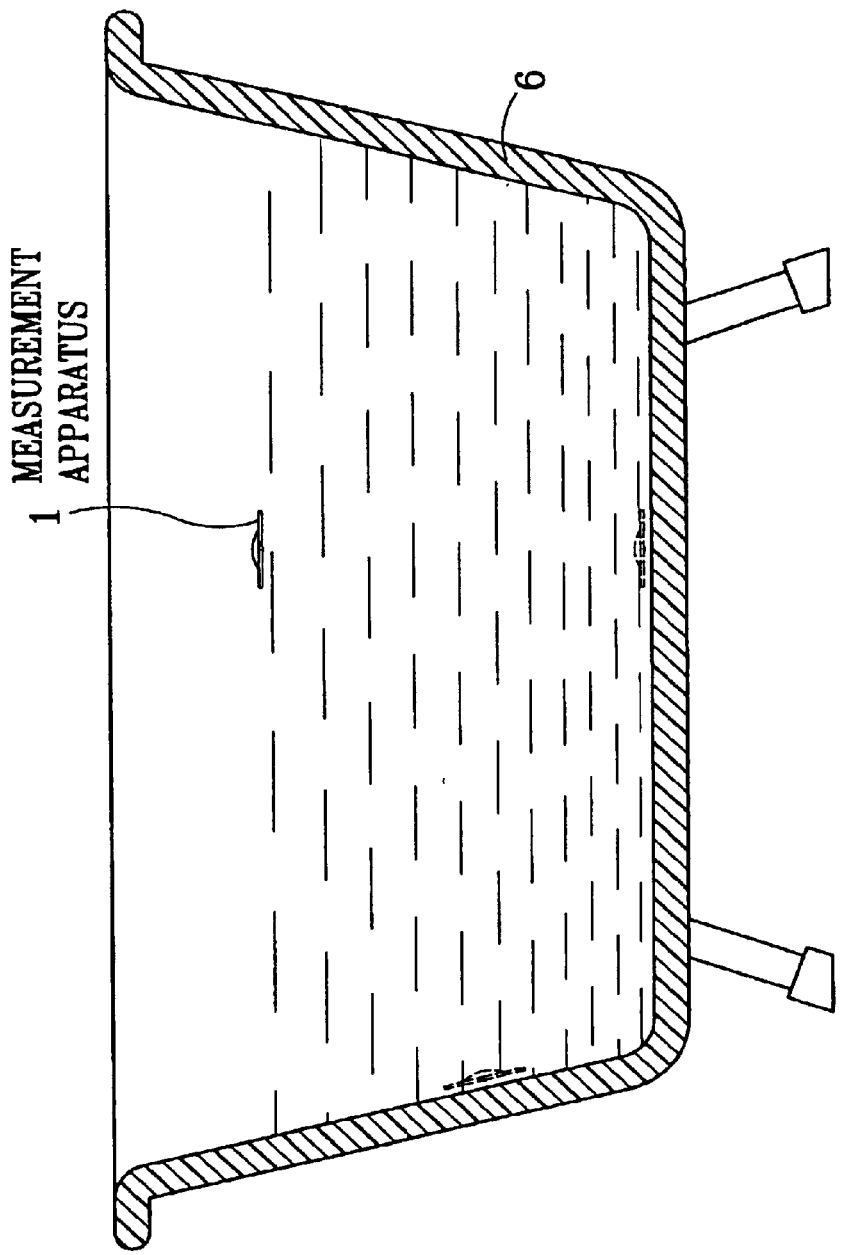
FIG. 5 is a schematic view of another embodiment of the invention in use.

Refer to FIG. 5 for a further embodiment of the invention in use. The patch measuring apparatus 1 is attached to an inner wall or a bottom of a bathtub 6, or floats on water surface to measure water temperature. When the receiving apparatus 2 is moved nearby or within the effective distance, press the measuring switch 22 of the receiving apparatus 2, the receiving apparatus 2 immediately receives water temperature detected by the measuring apparatus 1. User can know in advance water temperature before taking bath, or to avoid the infant from being hurt by too hot of water when taking bath for the infant. Thus the invention can function as a bathtub thermometer.

Figure 6:
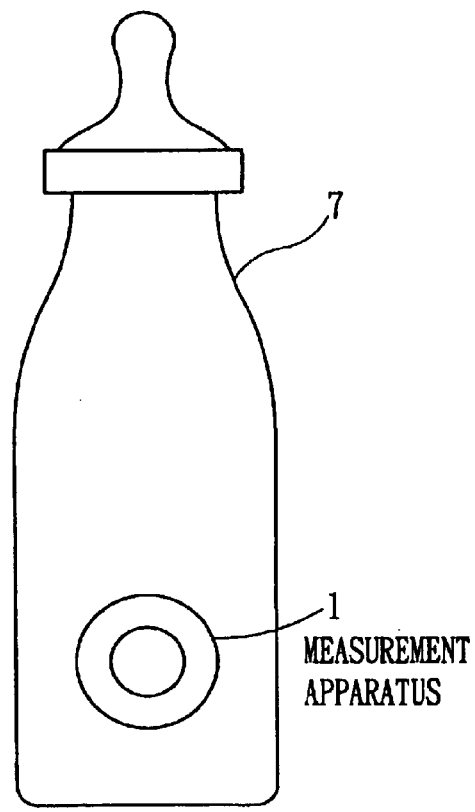
FIG. 6 is a schematic view of yet another embodiment of the invention in use.

Refer to FIG. 6 for yet another embodiment of the invention in use. The patch measuring apparatus 1 is attached to a feeding bottle 7. When the feeding bottle 7 is filled with water, the induction element 12 can measure water temperature being filled. When the receiving apparatus 2 is moved nearby or within the effective distance, press the measuring switch 22 of the receiving apparatus 2, the receiving apparatus 2 immediately receives water temperature detected by the measuring apparatus 1 to protect the infant from being hurt by too hot of milk or drinking water. Thus the invention can function as a feeding bottle thermometer.

Furthermore, when the receiving apparatus 2 is moved beyond the effective distance, and the measuring apparatus 1 is not induced by the magnetic field, electric power is cutoff.

What is claimed is:

1. An electronic patch thermometer for measuring the temperature of a targeted object, comprising:
    a measuring apparatus selectively attaching to or disposing on the targeted object; and
    a receiving apparatus for providing a magnetic field to the measuring apparatus and transferring to electric power required by the measuring apparatus receiving temperature signals transmitted from the measuring apparatus in a radio wave fashion and immediately displaying results in the form of numerals, audio alarm and speeches,
    wherein the measuring apparatus includes:
    a magnetic field induction unit for receiving magnetic field signals and converting to AC electric power for output;
    a conversion unit connecting to an output end of the magnetic field induction unit for converting the AC electric power to DC electric power for output;
    an induction unit for inducing the temperature of the targeted object;
    a data processing unit connecting to an output end of the induction unit for receiving temperature signals of the targeted object induced by the induction unit and processing the signals for output; and
    an emission unit connecting to an output end of the data processing unit for receiving the processed signals from the data processing unit and emitting the signals by radio waves.

2. The electronic patch thermometer of claim 1, wherein the measuring apparatus includes a patch which has one side with a temperature induction element located thereon and the other side with a circuit board and an induction coil located thereon, the circuit board having a data processing element, a conversion circuit and an emission end, the conversion circuit converting AC electric power to DC electric power for output.

3. The electronic patch thermometer of claim 1, wherein the receiving apparatus has a display screen, a measuring switch and a circuit located therein.

4. The electronic patch thermometer of claim 1, wherein the patch measuring apparatus is attached to one side of a pacifier, the temperature induction element being located in a sucking section of a pacifier through an extending rod.

5. The electronic patch thermometer of claim 1, wherein the patch measuring apparatus is selectively attached to an inner wall or a bottom of a bathtub, or floated o water surface to measure water temperature in the bathtub.

6. The electronic patch thermometer of claim 1, wherein the patch measuring apparatus is attached to a feeding bottle to allow a temperature induction element or an induction unit located in the measuring apparatus to measure water temperature filled in the feeding bottle.

7. The electronic patch thermometer of claim 1, wherein the magnetic field induction unit includes a magnetic field induction device and a high frequency electric coupling coil, the magnetic field induction device being formed by a coil.

8. The electronic patch thermometer of claim 1, wherein the induction unit is selectively a thermistor or a thermal induction element.

9. The electronic patch thermometer of claim 1, wherein the data processing unit is a microprocessor chip.

10. An electronic patch thermometer for measuring the temperature of a targeted object, comprising:
    a measuring apparatus selectively attaching to or disposing on the targeted object; and
    a receiving apparatus for providing a magnetic field to the measuring apparatus and transferring to electric power required by the measuring apparatus receiving temperature signals transmitted from the measuring apparatus in radio wave fashion and immediately displaying results in a form of numerals, audio alarming or speeches, wherein the receiving apparatus includes:
    a power supply unit;
    a magnetic field generation unit connecting to an output end of the power supply unit for converting DC electric power to a magnetic field for emitting to the measuring apparatus;
    a receiving unit receiving signals emitted from the measuring apparatus; and
    a control unit connecting to an output end of the receiving unit for receiving signals output from the receiving unit, and processing and outputting the signals in the form of numerical data, speeches or audio alarm.

11. The electronic patch thermometer of claim 10, wherein the power supply unit is a battery or city power.

12. The electronic patch thermometer of claim 10, wherein the magnetic field generation unit includes a high frequency electric oscillation unit and a magnetic field generator, the magnetic field generator being formed by a coil, the high frequency electric oscillation unit converting DC electric power to AC electric power for output.

13. The electronic patch thermometer of claim 10 further having a display unit located in the receiving apparatus and connected to an output end of the control unit for displaying the temperature value.

14. The electronic patch thermometer of claim 10 further having an output unit located in the receiving apparatus and being selectively a buzzer or a speaker.

15. The electronic patch thermometer of claim 10, wherein when the receiving apparatus is moved beyond an effective distance of a magnetic field, the measuring apparatus is not induced and cutoff from electric power and shutdown.

* * * * *